(12) United States Patent
Ma

(10) Patent No.: US 7,510,443 B2
(45) Date of Patent: Mar. 31, 2009

(54) ELECTRICAL CARD CONNECTOR

(75) Inventor: Wen-Qiang Ma, ShenZhen (CN)

(73) Assignee: Hon Hai Precision Ind. Co., Ltd., Taipei Hsien (TW)

(*) Notice: Subject to any disclaimer, the term of this patent is extended or adjusted under 35 U.S.C. 154(b) by 18 days.

(21) Appl. No.: 11/811,851

(22) Filed: Jun. 12, 2007

(65) Prior Publication Data
US 2007/0287311 A1 Dec. 13, 2007

(30) Foreign Application Priority Data
Jun. 12, 2006 (CN) .................... 2006 2 0073762 U

(51) Int. Cl.
*H01R 24/00* (2006.01)
(52) U.S. Cl. ....................................... 439/630
(58) Field of Classification Search ................ 439/630, 439/159, 188, 923, 64, 541.5, 489
See application file for complete search history.

(56) References Cited

U.S. PATENT DOCUMENTS

| 6,361,338 B1 * | 3/2002 | Chang | 439/159 |
| 6,375,482 B1 * | 4/2002 | Fan | 439/188 |
| 6,568,960 B2 * | 5/2003 | Bricaud et al. | 439/630 |
| 6,719,577 B2 * | 4/2004 | Nogami | 439/188 |
| 2007/0238338 A1 * | 10/2007 | Wang | 439/159 |

* cited by examiner

*Primary Examiner*—Edwin A. Leon
(74) *Attorney, Agent, or Firm*—Wei Te Chung

(57) ABSTRACT

An electrical card connector (1) includes a housing (10) having a main body (13), and first and second sidewalls (11,12) substantially parallel extending forwards form opposite ends of the main body; the main body defining a receiving cavity together with the first and second sidewalls for receiving an electrical card, a plurality of terminals (20) disposed in the housing and each having a connect portion (21) extending into the receiving cavity for contacting the card, and a pair of switching terminals (41, 42) engaged with the housing and each defining a contacting portion to connect with each other, and a cover (50) engaged with the housing and covering onto the contacting portions of the switching terminals.

18 Claims, 3 Drawing Sheets

ELECTRICAL CARD CONNECTOR

BACKGROUND OF THE INVENTION

1. Field of the invention

The present invention relates to electrical connectors, especially to a card connector provided for electrically connecting a card to a circuit board.

2. Description of Related Art

In electronic appliances, such as portable telephones, PDA, digital cameras and the like, addition of a variety of functions and identification of a user are achieved by inserting an IC card with a built-in IC, such as a SIM (subscriber identify module) card, an MMC (multimedia card), an SD (secure digital or super density) card, an MS (memory stick) card and the like therein. Such an IC card is usually connected to the circuit board via a card connector.

The IC card of this kind normally has some means for inhibiting the write operation in order to protect information stored in its internal memory. A means is also provided to cancel the write protection to allow information to be written from an electronic device into the memory of the IC card. In order to contact or cut electrically between IC card and the electronic device accurately and conveniently, the card connector commonly equips with switches to achieve above-mentioned object.

U.S. Pat. No. 6,135,809 shows a conventional card connector comprising an insulative housing, a plurality of terminals retained in the housing, and a detecting device positioned on one side of the housing for detecting of a card. The housing defines a main body and a pair of sidewalls parallel to each other and extending forwards from two opposite sides of the main body and defining a receiving space therebetween for receiving an IC card therein. The main body defines a plurality of passageways therethrough for receiving corresponding terminals therein. The detecting device is engaged with one side of the housing for detecting the IC card out and comprises a first piece of metal made from a stationary piece of metal having a first contacting portion; and a second piece of metal having a second contacting portion, the first and second contacting portions can come in contact with each other before the IC card is inserted into the receiving space of the housing. At this time, the IC card is on a protect-on position (write inhibit position). The first and second contacting portions can separate from each other when the IC card is completely inserted into the receiving space of the housing. At this time, the IC card is on a protect-off position (write enable position).

However, because the first piece meets with the second piece simply to connect each other, dust and other matter residing on both of communication portions thereof cannot be cleared automatically so that the connecting performance is not reliable. Furthermore, when the IC card is detected or inserted manually frequently, fingers of users' are easy to touch the first and second contacting portions of corresponding pieces thereby reducing conductivity of the detecting device or damaging the detecting device.

Therefore, an improved card connector is desired to overcome the disadvantages of the prior arts.

SUMMARY OF THE INVENTION

An object of the present invention is to provide a card connector in which wear damage of corresponding switch thereof due to insertion or ejection movement of IC cards can be reduced.

In order to achieve above-mentioned object, an electrical card connector in accordance with a preferred embodiment of the present invention comprises an insulative housing defining a main body defining a plurality of passageways for receiving corresponding terminals therein and first and second sidewalls substantially parallel extending forwards from two opposite sides of the main body, a plurality of terminals received in the housing and each having a contact portion extending into the receiving cavity for contacting the electrical card, a hook and a cover engaged with the housing defining a receiving cavity together with the main body, the first and second sidewalls for receiving an electrical card therein, a detecting device mounted onto the housing and the cover partly covered onto the housing for covering the detecting device. The detecting device comprises a first switch and a second switch engaged with the first switch during the card inserting into the receiving cavity. The cover comprises a base for substantially covering corresponding contacting portions of the first and second switching terminals, a hook portion integratedly extending from one end along a longitudinal direction thereof, a protrusion extending downwardly from the other end thereof, and a block extending downwardly from a lateral edge of the hook portion, together with the protrusion, for respectively engaged with corresponding slot and cutout of the housing to secure the cover onto the housing.

Other objects, advantages and novel features of the present invention will become more apparent from the following detailed description of the present embodiment when taken in conjunction with the accompanying drawings.

DETAILED DESCRIPTION OF THE INVENTION

Figure 1:
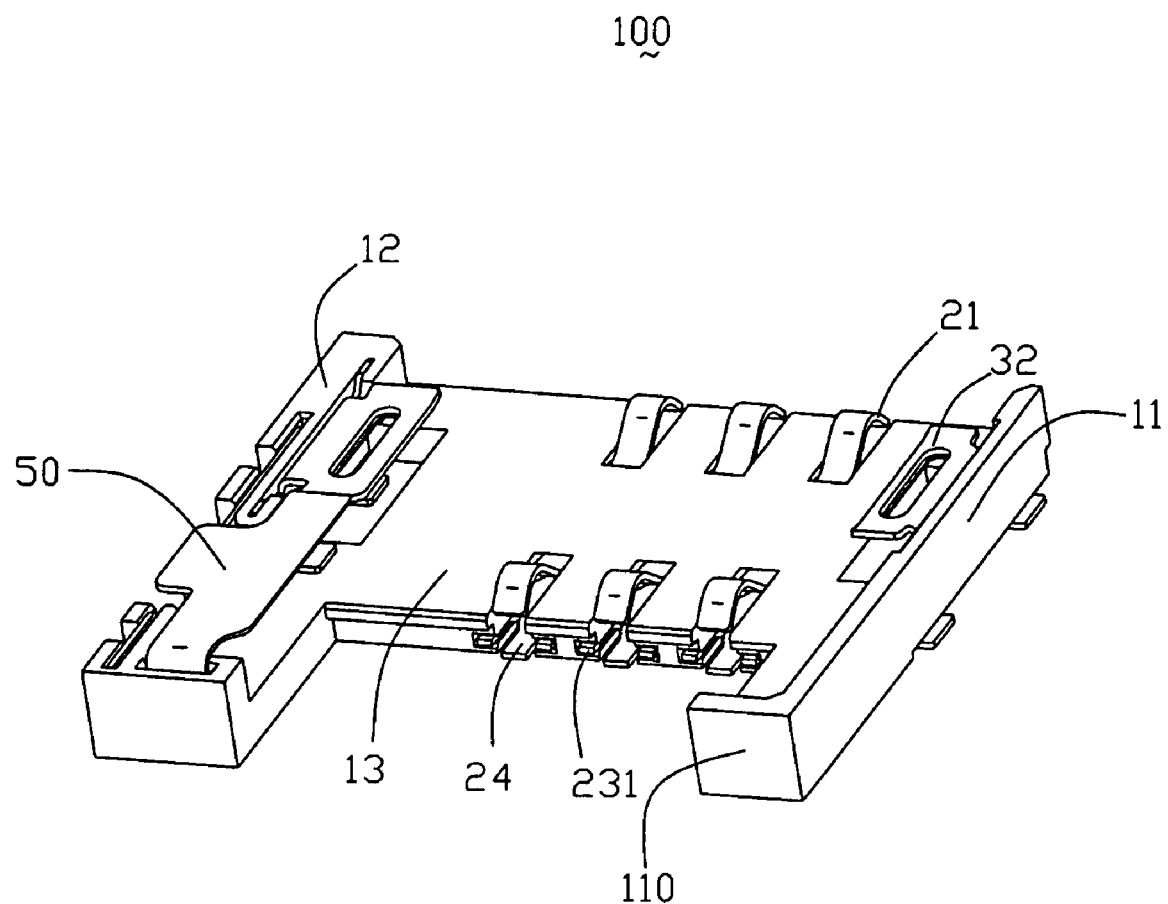
FIG. 1 is an assembled perspective view of a card connector in accordance with the preferred embodiment of the present invention.

Reference will now be made to the drawing figures to describe the preferred embodiment of the present invention in detail.

Figure 2:
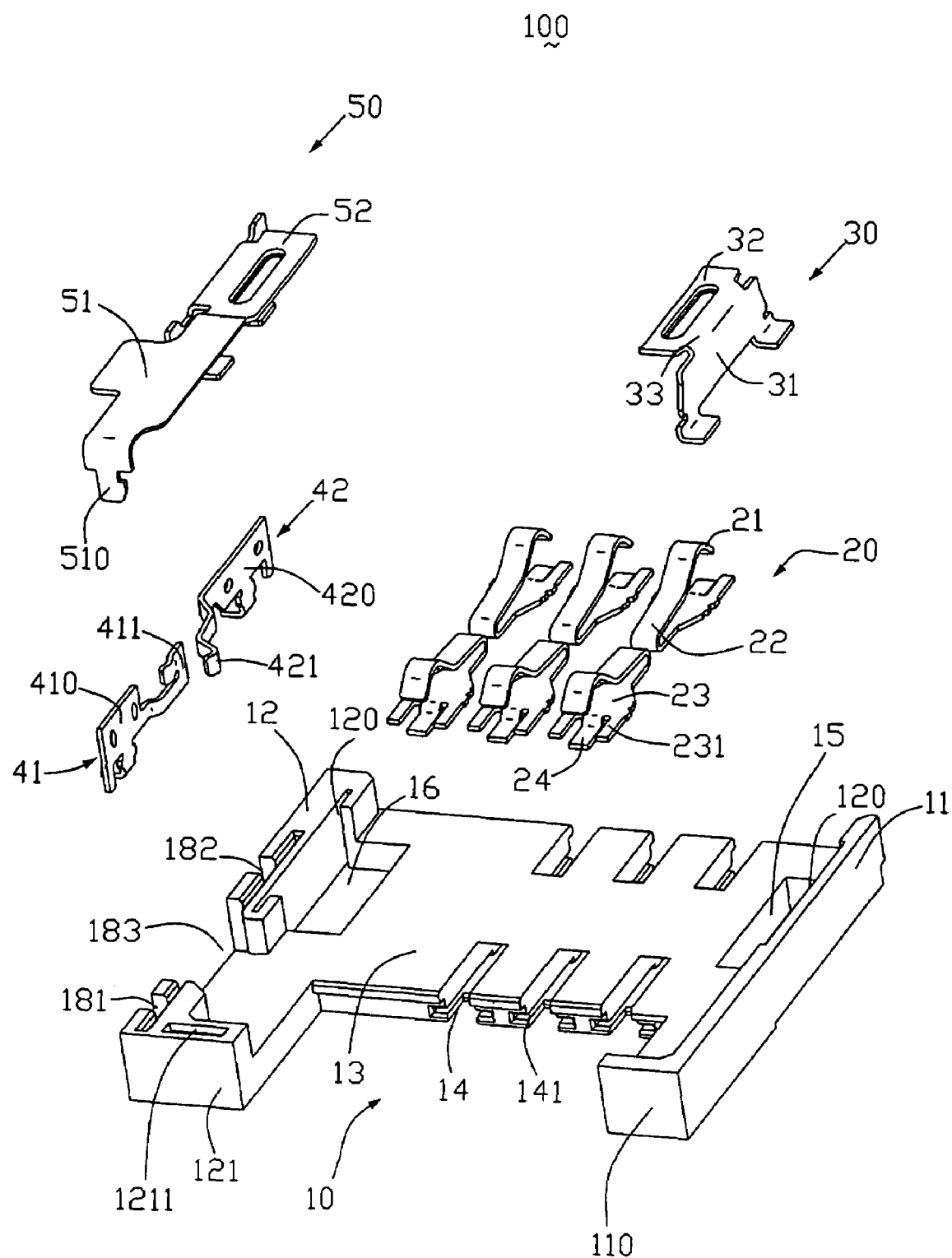
FIG. 2 is an exploded, perspective view of the card connector of FIG. 1.

Referring to FIGS. 1 and 2, a card connector 100 for connecting a card (not shown) to a circuit board (not shown) in accordance with the preferred embodiment of the present invention comprises an insulative housing 10, a plurality of terminals 20 received in the housing 10, a detecting device (not labeled) received in a front portion of the housing 10, a hook 30 engaged with one end of the housing 10, and a cover 50 engaged with opposite end of the housing 10 for covering on top of the detecting device.

The housing 10 defines a main body 13, a first sidewall 11 and a second sidewall 12 extending from two opposite sides of the main body 13, which together define an upward receiving cavity (not labeled), for receiving the card therein. The main body 13 defines a plurality of passageways 14 for receiving the corresponding terminals 20 therein. Each passageway 14 defines a pair of notches 141 on two opposite inner surfaces thereof. A pair of cavities 15, 16 are defined on respective connecting areas connecting the main body 13 and the first or second sidewalls 11, 12 close to their respective rear portions. A pair of slots 120 is formed on respective inner surfaces of the first and second sidewalls 11, 12 toward to the corresponding cavities 15, 16 for engaging with the hook 30 and the cover 50. The first sidewall 11 defines a first flange 110 at its front portion thereof, while the second sidewall 12 also defines a second flange 121 at its front portion thereof so as to make the second sidewall 12 longer than the first sidewall 11 along front-to-back direction. A cutout 1211 is defined on an upper surface of the second flange 121 thereof. First and second switching recesses 181, 182 are formed on a lateral edge of the second sidewall 12 and respectively adjacent to the cutout 1211 and the cavity 16, and an opening 183 formed between the first and second recesses 181, 182.

Each of the terminal 20 comprises a retaining portion 23, a connecting portion 21 extending slantly and upwardly from one end of the retaining portion 23 and a soldering portion 24 extending from the opposite end of the retaining portion 23. A connection portion 22 is curvedly connected between the connecting portion 21 and the retaining portion 23. A pair of securing portions 231 is formed on two sides of the soldering portion 24 for wedging into the corresponding notches 141 of the passageways 14.

The hook 30 is engaged with the slot 120 of the first sidewall 11 and defines a engaging portion 31 having two soldering legs (not labeled) formed at one end thereof, a planar portion 32 extending from the opposite end of the securing portion 31 and a connecting portion 33 arcuately connecting the securing portion 31 and the planar portion 32. The planar portion 32 is cooperated with the main body 13, the first and second sidewalls 11, 12 of the housing 10 to form the receiving cavity for receiving the card therein. The soldering legs of the engaging portion 31 are provided to solder the hook 30 onto the PCB.

The detecting device is used for detecting whether the card is completely assembled, and includes a first switching terminal 41 and a second switching terminal 42 which can be either connected together or separate from each other. The first switching terminal 41 comprises a first base portion 410 having a projection (not labeled) on a lateral end thereof, a first mounting leg (not labeled) extending downwardly from a bottom end of the first base portion 410 and a pair of barbs (not labeled) formed on opposite edges of the first mounting leg, a first contacting portion 411 extending resiliently outward from an end opposite to the projection of the first base portion 410. The second switching terminal 42 comprises a second base portion 420 also having another projection (not labeled) at an end away from the first switching terminal 41 thereof, a second mounting leg (not labeled) extending downwardly from a bottom end of the second base portion 420, and a second contacting portion 421 extending resiliently outward from the opposite end of the second base portion 420 along a same direction as the first contacting portion 411 of the first switching terminal 41. The first and second switching terminals 41, 42 can engage with the housing 10 via the corresponding first and second base portions 410, 420 interferentially securing into the first and second switching recesses 181, 182 of the housing 10. Thus the first contacting portion 411 and the second contacting portion 421 can engage with each other in the opening 183 between the first and second switching recesses 181, 182.

Figure 3:
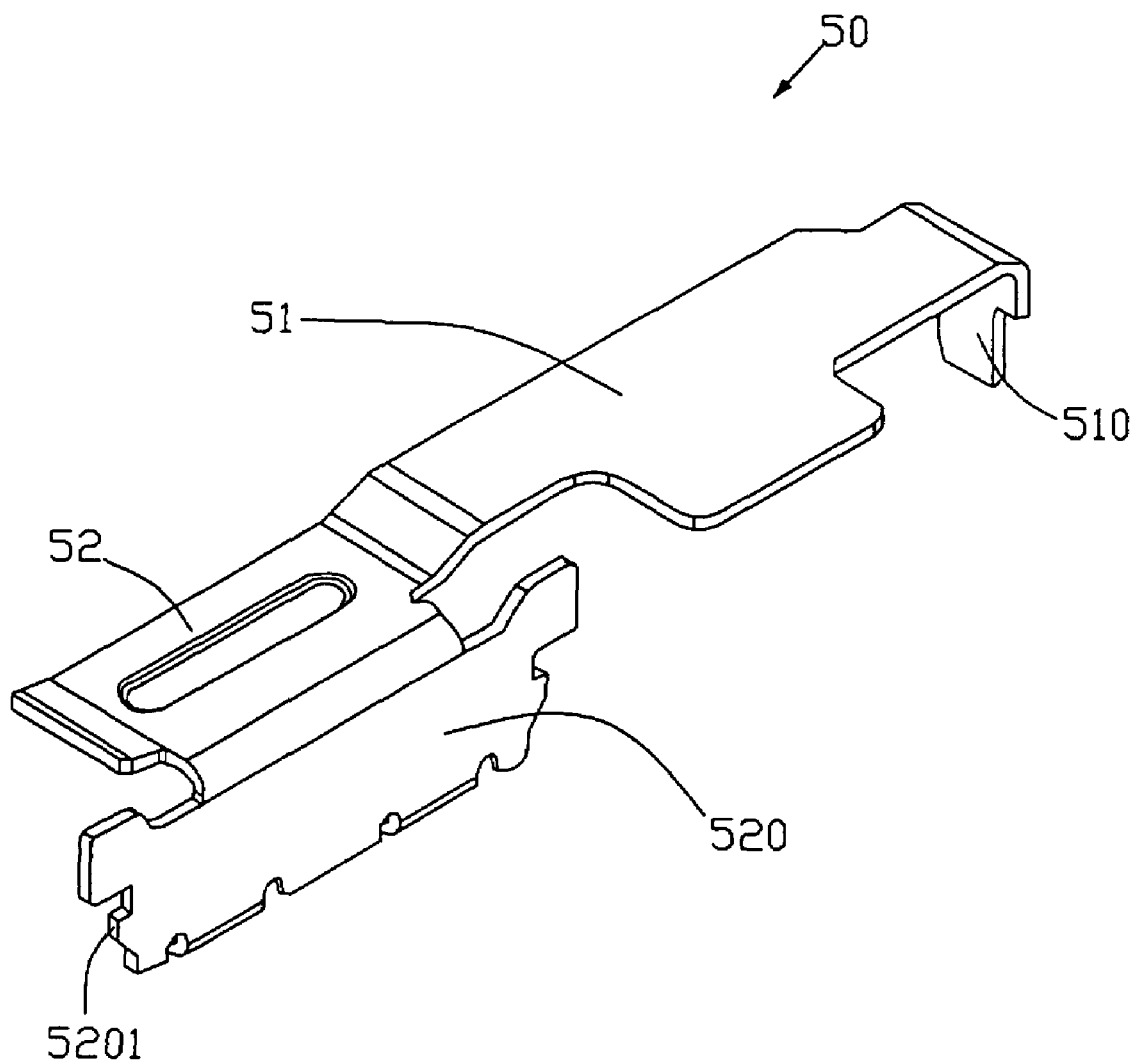
FIG. 3 is an perspective view of a cover of the card connector of FIG. 1.

Referring to FIG. 3, the cover 50 defines a rectangular base/lid 51 for substantially covering corresponding the first and second contacting portions 411, 421 of the first and second switch terminals 41, 42, a hook portion 52 connecting with the base 51, a protrusion 510 extending downwardly from an end opposite to the hook portion 52 thereof, and a block 520 extending downwardly form a lateral edge of the hook portion 52. The protrusion 510 and the block 520 are together for engaging with corresponding cutout 1211 and slot 120 of the second sidewall 12 of the housing 10 to secure the cover 50 onto the housing 10. A pair of ribs 5201 is formed on two opposite lateral edges of the block 520 thereof.

In assembly, the terminals 20 are firstly assembled into corresponding passageways 14 at the main body 13 of the housing 10 via the securing portions 231 of the terminal 20 wedging into the corresponding notches 141 of the passageways 14. Secondly the first and second switching terminals 41, 42 are respectively fixed onto the housing 10 via the corresponding first and second base portions 410, 420 interferentially engaged into corresponding first and second switching recesses 181, 182. At this state, the first and second contacting portions 411, 421 engages with each other in the opening 183 between the first and second switching recesses 181, 182. Then the hook 30 is mounted onto the housing 10 via the engaging portion 31 received in the slot 120 of the first sidewall 11. Lastly, the cover 50 is disposed on top of the second sidewall 12 with its protrusion 510 and block 520 respectively engaged with the corresponding cutout 1211 and slot 120 of the second sidewall 12 so as to substantially cover over the contacting portions 411, 421 of the switching terminals 41, 42. At this position, the hook portion 52 of the cover 50 also covers onto the cavity 16. In normal position before the card insertion into the receiving cavity, the first contacting portion 411 of the first switching terminal 41 and the second contacting portion 421 of the second switching terminal 42 are in disengagement with each other.

When the card is inserted into the receiving cavity with its two side surfaces sliding against the inner surfaces of the first and second sidewalls 11, 12 to substantially contact with the connecting portion 21 of the terminal 20, the contacting portions 411, 421 are in engagement with each other. Because the contacting portions 411, 421 are substantially covered by the base 51 of the cover 50, when the card is detected manually frequently, fingers of a user will not touch the first and second contacting portions 411, 421 of the corresponding first and second switching terminals 41, 42. Reliable conductivity of the first and second switching terminals 41, 42 is thus obtained.

However, the disclosure is illustrative only, changes may be made in detail, especially in matter of shape, size, and arrangement of parts within the principles of the invention.

What is claimed is:

1. An electrical card connector comprising:

an insulative housing having a main body, and first and second sidewalls substantially parallelly extending vertically from opposite ends of the main body;

a hook engaged with the first sidewall of the housing and, together with the main body, the first and second sidewalls defining a receiving cavity for receiving an electrical card;

a plurality of terminals disposed in the housing and having connecting portions extending into the receiving cavity for contacting the electrical card;

a pair of switching terminals engaged with the housing and each switching terminal defining a contacting portion, the contacting portions engaged with each other during insertion of the electrical card into the receiving cavity and disengaged from each other during withdrawal of the electrical card from the receiving cavity; and wherein a cover is mounted onto a top of the second sidewall and defines a base and a hook portion integral with the base, the base and the hook portion being substantially over the contacting portions of the switching terminals to prevent a user's fingers from touching the contacting portions of the switching terminals.

2. The electrical card connector as described in claim 1, wherein the cover defines a protrusion extending downwardly from an edge opposite to the hook portion of the base.

3. The electrical card connector as described in claim 2, wherein a block is extended downwardly from a lateral edge of the hook portion and defines a pair of ribs at opposite edges thereof.

4. The electrical card connector as described in claim 1, wherein the first switching terminal comprises a first base portion having a projection on a lateral end thereof, a first mounting leg extending downwardly from a bottom end of the first base portion and a pair of barbs formed on opposite edges of the first mounting leg, and a first contacting portion extending resiliently outward from an end opposite to the projection of the first base portion.

5. The electrical card connector as described in claim 4, wherein the second switching terminal comprises a second base portion also having another projection at an end away from the first switching terminal thereof, a second mounting leg extending downwardly from a bottom end of the second base portion, and a second contacting portion extending resiliently outward from die opposite end of the second base portion along a same direction as the first contacting portion of the first switching terminal.

6. The electrical card connector as described in claim 1, wherein the main body defines a plurality of passageways for receiving corresponding terminals therein, each passageway defining a pair of notches on two opposite inner surfaces thereof.

7. The electrical card connector as described in claim 6, wherein a pair of cavities are defined on respective rear connecting areas connecting the main body and the first or second sidewalls close to their respective rear portions, and a pair of slots are formed on respective inner surfaces of the first and second sidewalls facing corresponding cavities for respectively engaging with the hook and the securing portion of the cover.

8. The electrical card connector as described in claim 7, wherein the first sidewall defines a first flange at a front portion thereof and the second sidewall also defines a second flange at a front portion thereof, the second sidewall being longer than the first sidewall along front-to-back direction.

9. The electrical card connector as described in claim 8, wherein a cutout is defined on an upper surface of the second flange defined on one aid of the second sidewall for receiving corresponding projection of the cover.

10. The electrical card connector as described in claim 9, wherein first and second switching recesses are formed on a lateral edge of the second sidewall and respectively adjacent to the cutout, and an opening is formed between the first and second recesses.

11. The electrical card connector as described in claim 6, wherein the terminal comprises a retaining portion, a connecting portion extending slantly and upwardly from one end of the retaining portion, and a soldering portion extending from the opposite end of the retaining portion.

12. The electrical card connector as described in claim 11, wherein a pair of engaging portions are formed on two sides of the soldering portion and wedge into corresponding notches of the passageway.

13. The electrical card connector as described in claim 1, wherein the hook defines a securing portion having two soldering legs formed at one end thereof, a planar portion extending from the opposite end of the securing portion.

14. An electrical card connector comprising:
    an insulative housing including a base defining two opposite side portions thereof and a card receiving cavity thereabove;
    a plurality of contacts disposed in the housing and defining contact sections extending upwardly beyond an upper face of the base;
    a pair of switch contacts located on one of said side portions;
    a metallic hook assembled to the other of said side portions and defining an upper horizontal plate vertically spaced from the upper face of the base with a distance; and
    a metallic cover assembled to said one of the side portions and including a hook section having another upper horizontal plate vertically space form the upper face of the base with said distance so as to cooperate with the hook to hold an inserted card in position; wherein
    said cover further includes an extending lid to vertically cover the pair of switch contacts.

15. The electrical card connector as described in claim 14, wherein said extending lid is dimensioned to cover a portion of the card receiving cavity.

16. The electrical card connector as described in claim 14, wherein said housing further includes a pair of side arms on the side portions.

17. The electrical card connector as described in claim 16, wherein said hook and said cover are retained to the corresponding side arms, respectively.

18. An electrical card connector comprising:
    an insulative housing having a main body, and first and second sidewalls substantially parallelly extending from opposite ends of the main body;
    a hook engaged with the first sidewall of the housing and, together with the main body, the first and second sidewalk defining a receiving cavity for receiving an electrical card;
    a plurality of terminals disposed in the housing and having connecting portions extending into the receiving cavity for contacting the electrical card;
    a pair of switching terminals engaged with the housing and each switching terminal defining a contacting portion, the contacting portions engaged with each other during insertion of the electrical card into the receiving cavity and disengaged from each other during withdrawal of the electrical card from the receiving cavity, wherein the first switching terminal comprises a first base portion having a projection on a lateral end thereof, a first mounting leg extending downwardly from a bottom end of the first base portion and a pair of barbs formed on opposite edges of the first mounting leg, and a first contacting portion extending resiliently outward from an end opposite to the projection of the first base portion; and
    wherein a cover is mounted onto a top of the second sidewall and defines a base and a hook portion integral with the base, the base and the hook portion being substantially over the contacting portions of the switching terminals to prevent a user's fingers from touching the contacting portions of the switching terminals.

* * * * *